US010375456B2

(12) United States Patent
Noronha et al.

(10) Patent No.: US 10,375,456 B2
(45) Date of Patent: Aug. 6, 2019

(54) PROVIDING HIGHLIGHTS OF AN EVENT RECORDING

(71) Applicants: Austin Noronha, Sunnyvale, CA (US); Udupi Ramanath Bhat, Mountain View, CA (US)

(72) Inventors: Austin Noronha, Sunnyvale, CA (US); Udupi Ramanath Bhat, Mountain View, CA (US)

(73) Assignees: SONY CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 0 days.

(21) Appl. No.: 15/685,372

(22) Filed: Aug. 24, 2017

(65) Prior Publication Data

US 2018/0302694 A1 Oct. 18, 2018

Related U.S. Application Data

(60) Provisional application No. 62/485,528, filed on Apr. 14, 2017, provisional application No. 62/485,564, filed on Apr. 14, 2017.

(51) Int. Cl.

| | |
|---|---|
| ***H04N 7/173*** | (2011.01) |
| ***H04N 21/858*** | (2011.01) |
| ***G06F 3/048*** | (2013.01) |
| ***H04N 9/87*** | (2006.01) |
| ***H04N 21/4722*** | (2011.01) |
| ***G06F 16/48*** | (2019.01) |
| ***H04N 5/91*** | (2006.01) |

(Continued)

(52) U.S. Cl.

CPC .......... *H04N 21/858* (2013.01); *G06F 3/048* (2013.01); *G06F 16/48* (2019.01); *H04N 5/91* (2013.01); *H04N 9/8715* (2013.01); *H04N 21/2743* (2013.01); *H04N 21/4722* (2013.01); *H04N 21/47205* (2013.01); *H04N 21/8456* (2013.01); *H04N 21/8545* (2013.01); *H04N 21/8549* (2013.01)

(58) Field of Classification Search

CPC .... H04N 7/16; H04N 21/858; H04N 21/4722; H04N 21/42203; H04N 21/4223; H04N 21/43; H04N 21/462; H04N 21/466; H04N 21/4788; G06F 3/048; G06F 17/30038

USPC .......... 725/134, 138, 139–142; 348/564, 734

See application file for complete search history.

(56) References Cited

U.S. PATENT DOCUMENTS 7,949,669 B2 * 5/2011 Tischer ............ G06F 17/30864 707/758

8,667,553 B2 * 3/2014 Zdepski ................ H04N 7/165 709/219

(Continued)

*Primary Examiner* — Trang U Tran

(74) *Attorney, Agent, or Firm* — Trellis IP Law Group, PC

(57) ABSTRACT

Implementations generally relate to providing highlights of an event recording. In some implementations, a method includes receiving, at a client device, a video stream associated with an event. The method further includes receiving, at the client device, one or more tag commands from a user. The method further includes generating one or more tags based on the one or more tag commands, where each tag of the one or more tags tags a portion of the video stream. The method further includes tagging one or more portions of the video stream based on the one or more tags. The method further includes storing a copy of the video stream and the one or more tags on the client device.

20 Claims, 16 Drawing Sheets

100

(51) Int. Cl.

| | |
|---|---|
| ***H04N 21/2743*** | (2011.01) |
| ***H04N 21/472*** | (2011.01) |
| ***H04N 21/845*** | (2011.01) |
| ***H04N 21/8545*** | (2011.01) |
| ***H04N 21/8549*** | (2011.01) |

(56) References Cited

U.S. PATENT DOCUMENTS

| | | | | |
|---|---|---|---|---|
| 8,966,513 | B2 | 2/2015 | John | |
| 9,008,489 | B2 | 4/2015 | Nakazawa | |
| 9,652,459 | B2 | 5/2017 | Dombrowski et al. | |
| 2009/0132924 | A1 | 5/2009 | Vasa | |
| 2013/0326406 | A1 | 12/2013 | Reiley | |
| 2016/0255375 | A1 | 9/2016 | Carniel et al. | |
| 2016/0365115 | A1 | 12/2016 | Boliek | |
| 2018/0025498 | A1* | 1/2018 | Omari | G01C 21/165 348/144 |

* cited by examiner

400

500

1000

1600

PROVIDING HIGHLIGHTS OF AN EVENT RECORDING

CROSS REFERENCE TO RELATED APPLICATIONS

This application claims priority from U.S. Provisional Patent Application Ser. No. 62/485,528, entitled PERSONAL VIDEO HIGHLIGHTS; EASY MECHANSIM TO CREATE HIGHLIGHTS OF AN EVENT RECORDING, filed on Apr. 14, 2017, and 62/485,564, entitled PERSONAL VIDEO HIGHLIGHTS; EASY MECHANSIM TO CREATE HIGHLIGHTS OF AN EVENT RECORDING, filed on Apr. 14, 2017, which are both hereby incorporated by reference as if set forth in full in this application for all purposes.

BACKGROUND

Video cameras are used to record events such as sports games. Often, event spectators such as parents or coaches are interested in viewing a game and sharing a recording of the game with others. Conventionally, a user takes a video for an entire event. The user can use forward and reverse features to view different portions of the video. The can also edit the recording using editing software.

SUMMARY

Implementations generally relate to providing highlights of an event recording. In some implementations, a method includes receiving, at a client device, a video stream associated with an event. The method further includes receiving, at the client device, one or more tag commands from a user. The method further includes generating one or more tags based on the one or more tag commands, where each tag of the one or more tags tags a portion of the video stream. The method further includes tagging one or more portions of the video stream based on the one or more tags. The method further includes storing a copy of the video stream and the one or more tags on the client device.

With further regard to the method, in some implementations, the video stream is received directly from a video camera. In some implementations, the video stream is a live video stream. In some implementations, the one or more tags include one or more of fixed tags and variable tags. In some implementations, the method further includes displaying a tag button in a graphical user interface on a display of the client device; and enabling the user to select the tag button, where one or more selections of the tag button generate the one or more tag commands. In some implementations, the method further includes displaying one or more tags in a graphical user interface on a display of the client device; receiving from the user a selection of one or more of the tags; and generating, at the client device, a video clip of one or more portions of the video stream based on the selection of the one or more tags. In some implementations, at least one operator user is designated to control a video camera that is capturing the video stream. In some implementations, the method further includes sending the one or more tags to a server, where the one or more tags are used to tag one or more portions of a copy of the video stream stored at the server.

In some embodiments, a computer-readable storage medium carries one or more sequences of program instructions thereon. When executed by one or more processors, the instructions cause the one or more processors to perform operations including receiving, at a client device, a video stream associated with an event; receiving, at the client device, one or more tag commands from a user; generating one or more tags based on the one or more tag commands, where each tag of the one or more tags tags a portion of the video stream; tagging one or more portions of the video stream based on the one or more tags; and storing a copy of the video stream and the one or more tags on the client device.

With further regard to the computer-readable storage medium, in some implementations, the video stream is received directly from a video camera. In some implementations, the video stream is a live video stream. In some implementations, the one or more tags include one or more of fixed tags and variable tags. In some implementations, the instructions when executed are further operable to perform operations including displaying a tag button in a graphical user interface on a display of the client device; and enabling the user to select the tag button, where one or more selections of the tag button generate the one or more tag commands. In some implementations, the instructions when executed are further operable to perform operations including displaying one or more tags in a graphical user interface on a display of the client device; receiving from the user a selection of one or more of the tags; and generating, at the client device, a video clip of one or more portions of the video stream based on the selection of the one or more tags. In some implementations, at least one operator user is designated to control a video camera that is capturing the video stream. In some implementations, the instructions when executed are further operable to perform operations including sending the one or more tags to a server, where the one or more tags are used to tag one or more portions of a copy of the video stream stored at the server.

In some implementations, a system includes one or more processors, and includes logic encoded in one or more non-transitory computer-readable storage media for execution by the one or more processors. When executed, the logic is operable to perform operations including receiving, at a client device, a video stream associated with an event; receiving, at the client device, one or more tag commands from a user; generating one or more tags based on the one or more tag commands, where each tag of the one or more tags tags a portion of the video stream; tagging one or more portions of the video stream based on the one or more tags; and storing a copy of the video stream and the one or more tags on the client device.

With further regard to the system, in some implementations, the video stream is received directly from a video camera. In some implementations, the video stream is a live video stream. In some implementations, the one or more tags include one or more of fixed tags and variable tags.

A further understanding of the nature and the advantages of particular implementations disclosed herein may be realized by reference of the remaining portions of the specification and the attached drawings.

DETAILED DESCRIPTION

Implementations generally relate to providing highlights of an event recording, where a user can view individual highlights of a game and not have to view the entire recording. As described in more detail herein, implementations may be provided by an event service or event cloud service, and may provide the user with mechanisms to create personalized tags of specific moments of an event such as a game. Implementations enable multiple users to create tags of an event recording simultaneously and to create other metadata such as annotations. Implementations enable a user to share a common video stream to other users.

Some implementations generally relate to providing smart tags. Implementations enable users to tag moments or event highlights in event recordings. Implementations also enable users to obtain video clips of event highlights that are tagged by other users such as friends and/or family. As such, users may watch video clips based on crowd sourced tags.

In some implementations, a system such as a client device receives a video stream associated with an event. The system further receives one or more tag commands from a user. The system further generates one or more tags based on the one or more tag commands, where each tag of the one or more tags tags a portion of the video stream. The system further tags one or more portions of the video stream based on the one or more tags. The system further stores a copy of the video stream and the one or more tags on the client device. Further implementations are described in more detail herein.

In some implementations, a system such as a server receives a video stream from a video camera. The system further receives tags from client devices, where each tag tags a portion of the video stream. The system further tags the video stream based on the tags. The system further groups the tags into tag groups, where each tag group includes one or more tags received from a particular client device.

Although implementations disclosed herein are described in the context of a sports event, these implementations and others may apply to any event or performance that is recorded.

Figure 1:
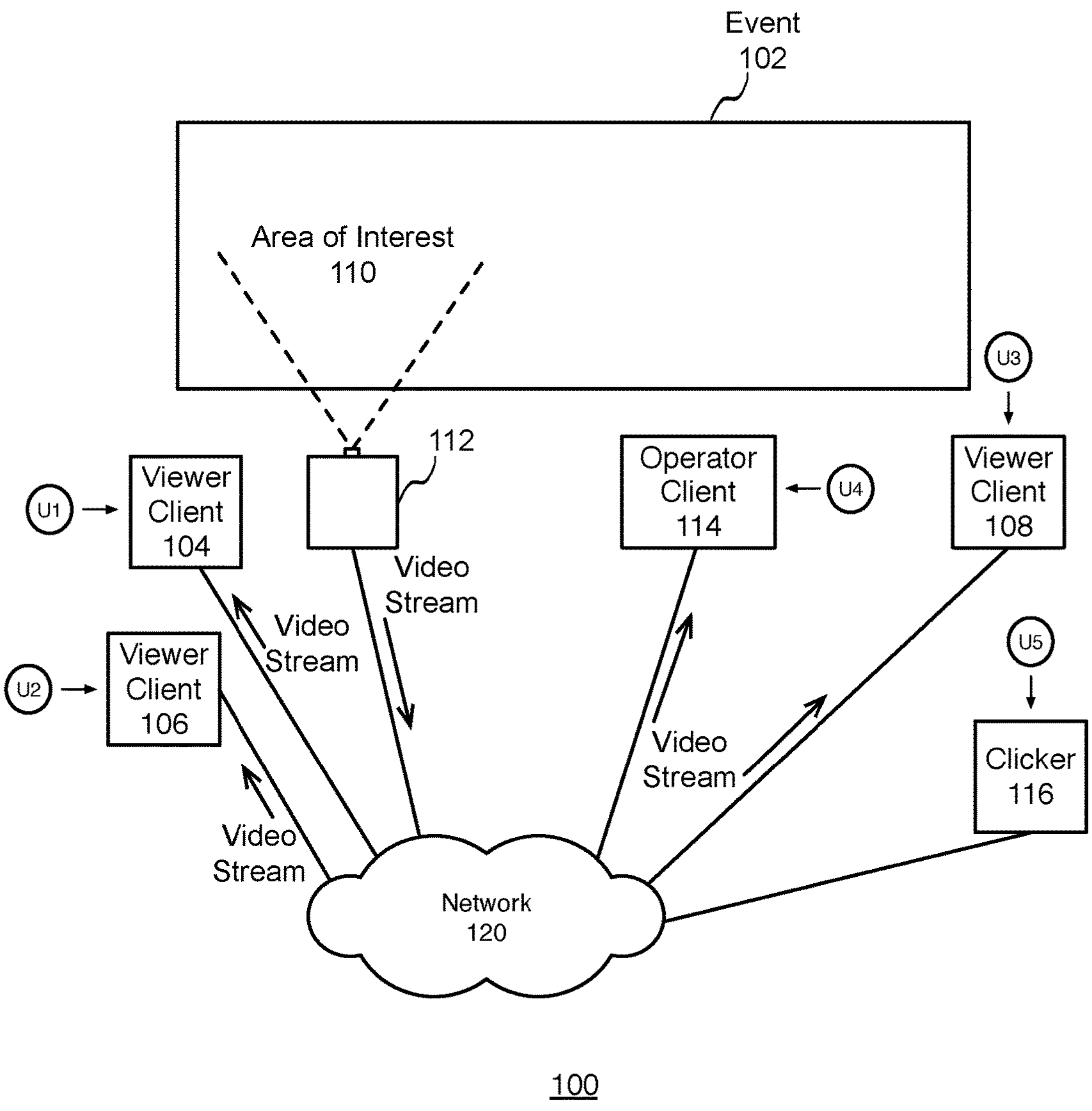
FIG. 1 illustrates a block diagram of an example event environment, which may be used for implementations described herein.

FIG. 1 illustrates a block diagram of an example event environment 100, which may be used for implementations described herein. Shown is an event 102. Event 102 may be a live event such as a sports event, and the live event may take place at a viewable area such as a field, stage, etc. The viewable area may be viewed by various spectators or viewers having mobile devices or viewer clients 104, 106, and 108. For example, spectators or viewers may include parents watching their kids playing a sport (e.g., soccer, football, etc.), or coaches watching the kids or athletes.

As shown, the viewers are positioned in various locations around event 102 (e.g., seated on chairs on a field, seated at bleachers, seated around an amphitheater, etc.), and the viewers may view an area of interest 110. Area of interest 110 may include athletes at a particular area on the field of sports game, for example. A video camera 112 captures the event, and, more specifically, records area of interest 110 and/or other areas of interest of event 102. As described in more detail herein, in some implementations, viewers log into the system to view an event recording, generate tags for highlighting moments of the event recording, and later view event highlights.

As shown, video camera 112 captures the event and sends a video stream directly to viewer clients 104, 106, and 108, as well as to an operator client 114. In some implementations, the video stream may be broadcast or multicast to viewer clients 104, 106, and 108, and operator client 114. Viewer clients 104, 106, and 108 may also be referred to as client devices 104, 106, and 108, and operator client 114 may also be referred to as client device 114. In some implementations, users associated with client devices 104, 106, 108, and 114 may be referred to users U1, U2, U3, and U4, respectively.

Client devices 104, 106, 108, and 114 may be mobile devices such as smartphones, tablet computers, wearable devices, etc. that views have with them while around event 102. In some implementations, one or more of client devices 104, 106, 108, and 114 may be desktop computers, laptop computers, etc. For example, in some scenarios, a viewer may be seated in a viewing box or office with a view of event 102 and may also view event 102 using a desktop or laptop computer.

In some implementations, authorized users log into and access network 120 via viewer clients 104, 106, and 108, and operator client 114 using an authentication process. Once connected to network 120, viewer clients 104, 106, and 108, and operator client 114 receive the video stream from video camera 112 via network 120. In some implementations, viewer clients 104, 106, and 108, and operator client 114 may connect with video camera 112 via a Wi-Fi connection. In some implementations, network 120 may be a local area network (LAN) or a wide area network (WAN). In some implementations, network 120 may be the Internet or a long-term evolution (LTE) network.

Video camera 112 may connect to network 120 in various ways (e.g., Wi-Fi, Ethernet, LTE, etc.). In various implementations, video camera 112 may be a video camera that is dedicated for recording events, or may be a video camera device that connects to an existing processor module that functions as a shared resource. Example implementations directed to video camera 112 are described in more detail herein.

In some implementations, at least one operator user associated with operator client 114 is designated to control video camera 112 that is capturing the video stream. The operator may be, for example, an administrator, a coach, an assistant, etc. In some implementations, the operator user may control video camera 112 using operator client 114. For example, operator client 114 may start and stop the event recording. While event 102 is being recorded, operator client 114 may be used to change the position of video camera 112 (e.g., pan or tilt camera 112 left-right, up-down, etc.), zoom in or zoom out, control exposure, control quality of capture, control network settings, etc.

In some implementations, operator client 114 receives one or more camera commands from the operator user. In various implementations, the camera commands includes movement commands. Operator client 114 sends the one or more camera commands to video camera 112 that is capturing the video stream, where the one or more camera commands control the movement and operations of video camera 112.

As shown, viewer clients 104, 106, and 108, and operator client 114 may connect to video camera 112 via network 120. In some implementations, video camera 112 may be a part of the system infrastructure connected to an existing access point. In some implementations, video camera 112 may itself function as an access point to network 120. In this scenario, viewer clients 104, 106, and 108, and operator client 114 may connect directly to video camera 112 via a Wi-Fi connection, and receive the video stream directly from video camera 112.

As described in more detail herein, each user may use their smartphones or other personal mobile device to identify personal key moments during the event by tagging the recording of the event. As described in more detail herein, viewer clients 104, 106, and 108, and operator client, as well as clicker 116 may be used to tag the recording of the event. Clicker 116 may be referred to as client device 116. As described in more detail herein, in some implementation, clicker 116 does not have a screen and may be used to tag the recording of the event where the user (e.g., U5) directly views the event live. In some implementations, clicker 116 may be a small hardware device such as a fob, key fob, etc. In some implementations, clicker 116 connects to video camera 112 via network 120, or may connect directly to camera 112 where video camera 112 via Wi-Fi, Bluetooth, or other networking techniques.

Implementations also enable a user to create and share a highlight clip of the key moments with other users. For example, a user may be a parent who may want to capture highlights of the parent's child during the game. In another example, a user may be a coach who may identify key game plays, tag the game plays, and provide one or more clips of the moments and annotations of the moments to share with players during a half-time session, post-game session, etc.

For ease of illustration, FIG. 1 shows three viewer clients 104, 106, and 108, one operator client 114, and one video camera 112. There may be any number of viewer clients, operator clients, and video cameras. For example, there may be multiple cameras set up around event 102 for capturing multiple areas of interest and/or capture the same area of interest from multiple perspectives. In various implementations, event environment 100 may not have all of the elements shown and/or may have other elements instead of, or in addition to, those shown herein.

Figure 2:
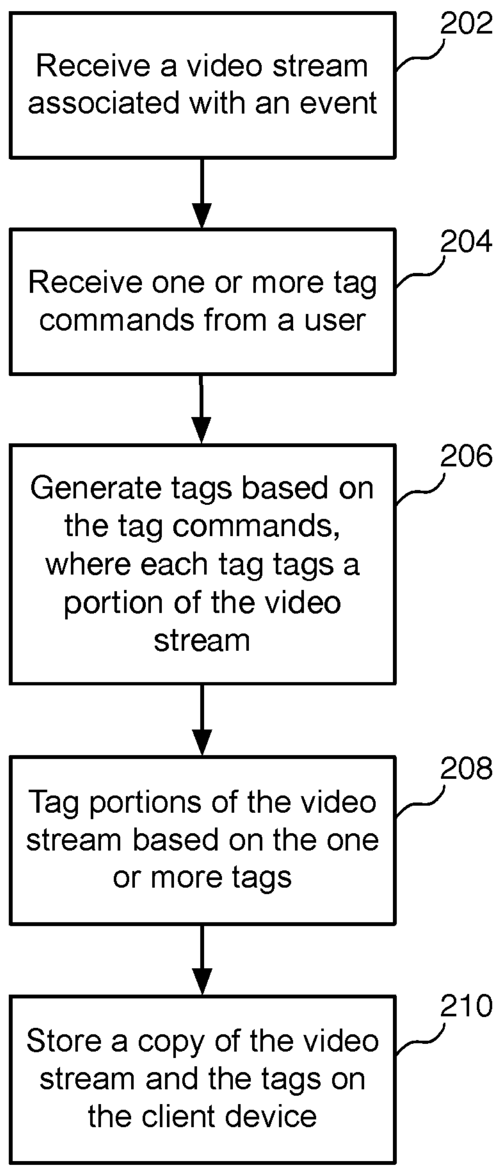
FIG. 2 illustrates an example flow diagram for providing highlights of an event recording, according to some implementations.

FIG. 2 illustrates an example flow diagram for providing highlights of an event recording, according to some implementations. Referring to both FIGS. 1 and 2, a method is initiated at block 202, where a system, such as a client device (e.g., viewer devices 104, 106, 108, and 114, etc.) receives a video stream associated with an event, such as event 102.

In some implementations, the client device receives video stream directly from a video camera, such as video camera 112. As indicated herein, in some implementations, the client device may receive video stream directly from video camera 112 via a Wi-Fi connection. In various implementations, the video stream is a live video stream capturing event 102.

At block 204, the client device receives one or more tag commands from a user. As described in more detail herein, each viewer may tag the video stream by selecting a tag button on the user interface of his or her client device.

At block 206, the client device generates one or more tags based on the one or more tag commands, where each tag tags a portion of the video stream. In various implementations, the video stream is stored separately from the tags commands and resulting tags.

In various implementations, tags demarcate portions of the video. For example, in some implementations, the tags include start time tags and end time tags. As described in more detail herein, in various implementations, the tags may include fixed tags and variable tags. Example implementations directed to tags, including fixed tags and variable tags are described in more detail herein.

At block 208, the client device tags one or more portions of the video stream based on the one or more tags. In some implementations, the video stream is stored at a suitable location associated with the server (e.g., a database) and then tagged. As a result, an event recording is tagged. Example implementations directed to tagging portions of the video stream or event recording are described in more detail herein.

At block 210, the client device stores a copy of the video stream and the one or more tags on the client device. Example implementations directed to storing a copy of the video stream on the client device are described in more detail herein.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While some implementations are described in the context of a client device of an example user, these implementations and others apply to multiple client devices of multiple users. For example, multiple users may tag the video stream on their respective client devices during the event, and multiple users may tag the video stream on their respective client devices simultaneously or substantially simultaneously.

Figure 3:
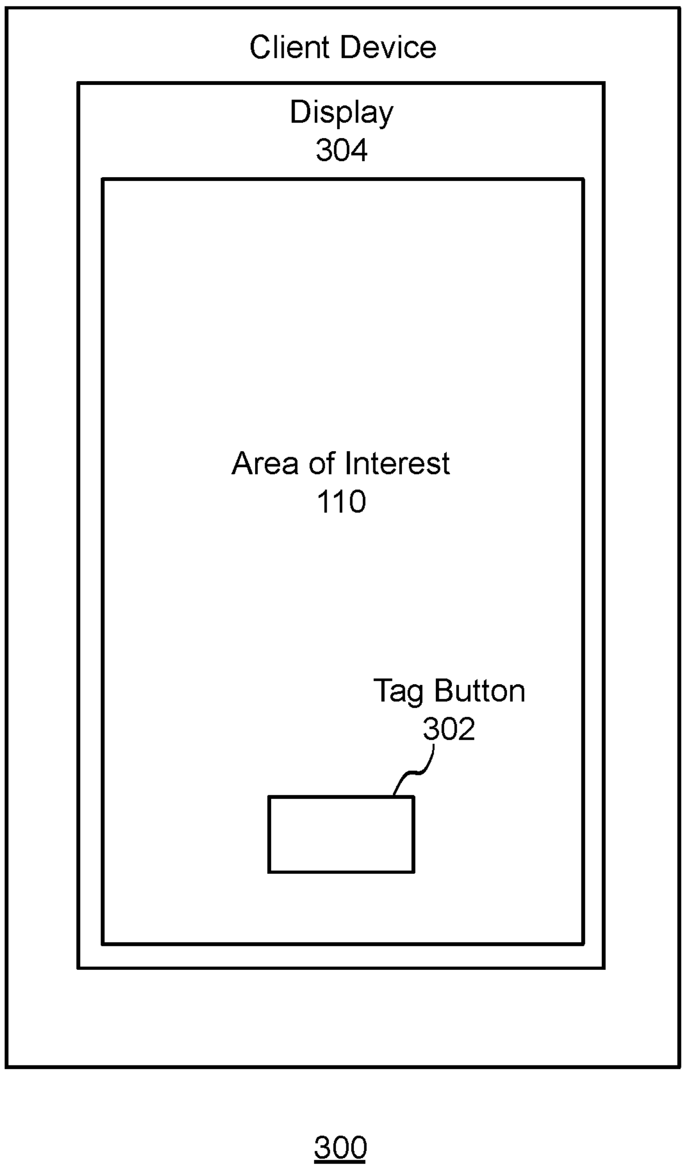
FIG. 3 illustrates a block diagram of an example client device, including a user interface having an example tag button, according to some implementations.

FIG. 3 illustrates a block diagram of an example client device 300, including a user interface having an example tag button 302, according to some implementations. For example, client device 300 may be used to implement any one of viewer clients 104, 106, and 108, or operator client 114. In this example scenario, video camera 112 is capturing area of interest 110, and viewer clients 104, 106, and 108, or operator client 114 display the same area of interest 110.

In some implementations, client device 300 displays tag button 302 in a graphical user interface on display 304 of client device 300. Client device 300 enables the user to select tag button 302 live, in real-time while event is taking place and being recorded. In various implementations, operator client 114 controls video camera 112, and viewer clients 104, 106, and 108 do not control video camera 112. Viewers may view event 102 directly rather than through their client devices, and viewers need not be concerned with the scene in the field of view being captured by video camera 112. As such, a viewer may select or tap tag button 302 without needing to look at area of interest 110 on device 300. The viewer can rely on the judgment of the operator viewer to control the video camera to capture appropriate footage of event 102 (e.g., area of interest 110), and that area of interest 110 displayed on client device 300 corresponds to where the viewer is looking. This is beneficial to the viewer, because the viewer can optionally view area of interest 110 on client device 300 or view area of interest directly without looking at display 304 on client device 300.

In some implementations, client device 300 displays tag button 302 in the graphical user interface on display 304 of client device 300 when the video stream is being received, and removes tag button 302 from the graphical user interface when the video stream is not being received.

In some implementations, client device 300 enables the user to hide or turn off the display of area of interest 110 while client device 300 still displays tag button 302 so that the user may continue to select tag button 302.

Figure 4:
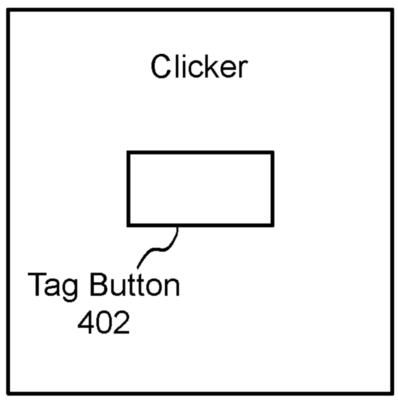
FIG. 4 illustrates a block diagram of an example clicker, according to some implementations.

FIG. 4 illustrates a block diagram of an example clicker 400, according to some implementations. In some implementations, clicker 400 includes a tag button 402. In some implementations, tag button 402 may be mechanical button that clicks when depressed. In some implementations, tag button 402 may be a button in a graphical user interface on a display. Clicker 400 enables the user to select tag button 402 live, in real-time while event is taking place and being recorded. As indicated herein, in some implementations, clicker 400 does not have a display screen. As such, the user views event 102 directly rather than through a client devices, and the user need not be concerned with the scene in the field of view being captured by video camera 112. As such, a viewer may rely on the judgment of the operator viewer to control the video camera to capture appropriate footage of event 102 (e.g., area of interest 110).

Figure 5:
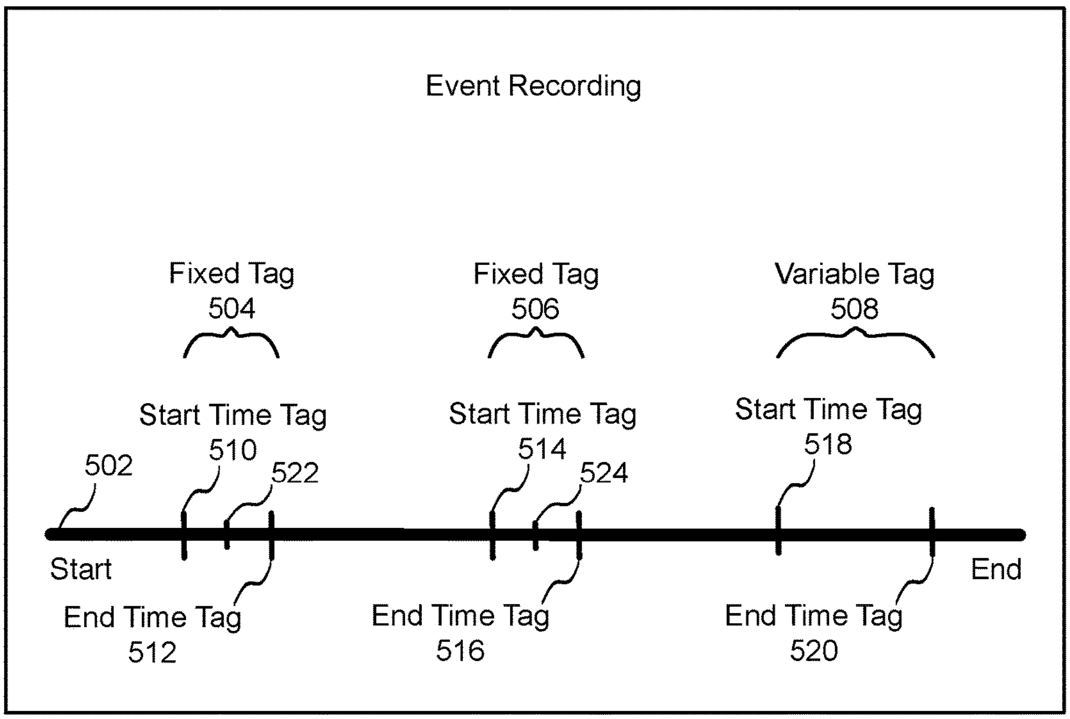
FIG. 5 illustrates a block diagram of an example event recording, according to some implementations.

FIG. 5 illustrates a block diagram of an example event recording 500, according to some implementations. Shown is a timeline 502 that represents the duration of event recording 500. In various implementations, when the user selects tag button, the selections of the tag button generate tag commands, where each tag command tags a portion of the video stream with tags 504, 506, and 508, also referred to as fixed tags 504 and 506, and variable tag 508, respectively. For example, when the user selects the tag button, the client device generates a tag command that generates tag 504. In various implementations, tag 504 includes a tag paring. In various implementations, the tag pairing includes a start time tag 510 and an end time tag 512. If the user selects the tag button again, the client device generates a tag command that generates tag 506, which includes another tag pairing, which includes a start time tag 514 and an end time tag 516. When the user selects the tag button again, the client device generates a tag command that generates another tag, which includes another tag pairing, which includes a start time tag 518 and an end time tag 520. For ease of illustration three tags 504, 506, and 508, or tag pairings of start time tags and end time tags are shown. There may be any number of tags, depending on the particular implementation. In various implementations, each tag pairing demarcates an event moment or event highlight.

In various implementations, as indicated herein, the tags may include fixed tags, and variable tags. In some implementations, for fixed tags such as tags 504 and 506, for example, when the user selects the tag button at a particular point in time 522, the client device sets start time tag 510 a predetermined amount of time before the tag button was pressed (e.g., 10 seconds before the tag button was pressed), and the client device also sets end time tag 512 a predetermined amount of time after the tag button was pressed (e.g., 10 seconds after the tag button was pressed). As such, the total time between the start time tag and the end time tag may be a predetermined duration (e.g., 20 seconds). Setting the start time tag a predetermined amount of time before the tag button was pressed creates tag buffer that accommodates a delay from the time the user decides to tag the event to the time the user actually selects the tag button.

Similarly, when the user selects the tag button at another particular point in time 524, the client device sets start time tag 514 a predetermined amount of time before the tag button was pressed (e.g., 10 seconds before the tag button was pressed), and the client device also sets end time tag 524 a predetermined amount of time after the tag button was pressed (e.g., 10 seconds after the tag button was pressed).

In some implementations, for variable tags such as tag 508, when the user selects the tag button and keeps the tag button selected (e.g., continuously selects/depresses/holds the tag button), the client device sets start time tag 518 at that particular point in time when the tag button is depressed. When the user deselects the tag button (e.g., releases the tag button), the client device sets end time tag 520 at that particular point in time when the tag button is released. As such, the total time between the start time tag and the end time tag may be a variable duration, depending how long the user keeps the tag button selected.

In some implementations, for variable tags, when the user selects the tag button (e.g., a single tap of the tag button), the client device sets the start time tag. When the user taps the tag button again, the client device sets the end time tag. As such, the total time between the start time tag and the end time tag may be a variable duration, depending time duration between the first selection/tap and the second selection/tap of the tag button.

In some implementations, as indicated herein, multiple cameras may be set up around event 102 for capturing multiple areas of interest and/or capture the same area of interest from multiple perspectives. As such, multiple video streams may be sent to client device 300 simultaneously. In some implementations, when a user tags a moment, client device 300 tags all received video streams at the same moments. In other words, the tags for all video streams will have the same time stamps.

Figure 6:
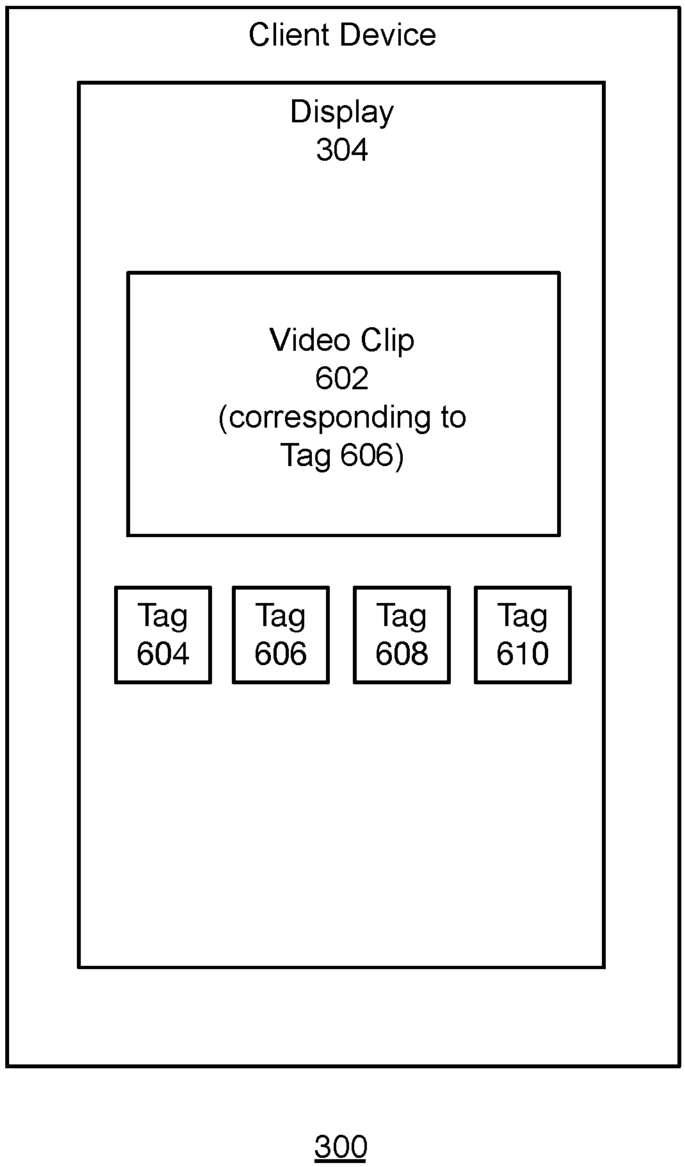
FIG. 6 illustrates a block diagram of an example viewer client device, including a user interface having example highlight recordings, according to some implementations.

FIG. 6 illustrates a block diagram of example viewer client device 300 of FIG. 3, including a user interface having example highlight recordings, according to some implementations. In some implementations, client device 300 displays in the graphical user interface of display 304, a video clip 602 and one or more tags 604, 606, 608, and 610. The displayed tags 604, 606, 608, and 610 may be referred to as event highlights. In various implementations, each tag demarcates event highlights. In various implementations, viewer client device 300 may display one or more icons or thumbnails that represent tags 604, 606, 608, and 610, that provide visual indicators of particular portion of the video stream (e.g., thumbnails, labels, etc.). For ease of illustration, six event highlights are shown. The actual number of event highlight may vary, depending the particular implementation.

In some implementations, client device 300 also receives from the user a selection of one or more of tags 604, 606, 608, and 610. In some implementation, the user may select one or more of tags 604, 606, 608, and 610 by tapping on display 302 if display 302 is a touch screen or other suitable means (e.g., clicking on one or more of tags 604, 606, 608, and 610 with a mouse, etc.). In various implementations, client device 300 generates a video clip of one or more portions of the video stream based on the selection of the tags. In some implementations, the client device enables the user to annotate one or more portions of the video. In some implementations, the client device enables the user to share the copy of video stream with others with or without annotations based on the one or more tags.

In some implementations, as indicated herein, multiple cameras may be set up around event 102 for capturing multiple areas of interest and/or capturing the same area of interest from multiple perspectives. As such, the user interface may show event highlights from multiple video streams, which the user may select for the video clip of highlights.

Figure 7:
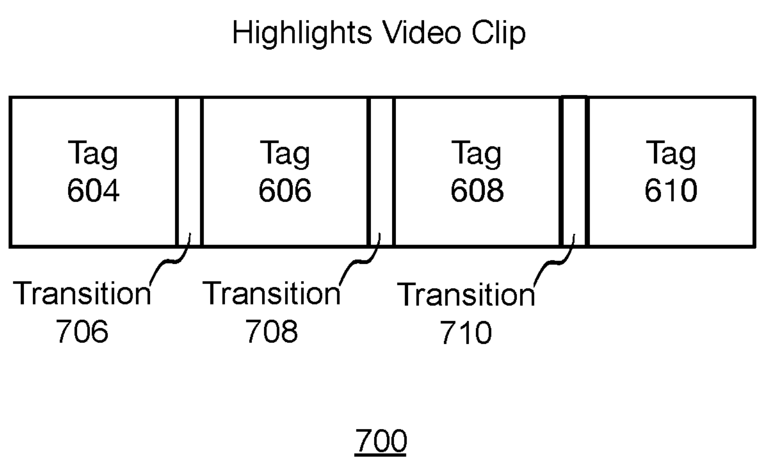
FIG. 7 illustrates a block diagram of an example highlights video clip that includes selected highlight recordings, according to some implementations.

FIG. 7 illustrates a block diagram of an example highlights video clip 700 that includes selected highlight recordings, according to some implementations. In this example scenario, tags 604, 606, 608, and 610 are selected. In various implementations, client device 300 concatenates the selected tags 604, 606, 608, and 610, which results in corresponding concatenated event highlight clips. In some implementations, highlights video clip 700 may transition from event highlight to event highlight using various transitions 706, 708, and 710, which may include user-selected special effects (e.g., dissolves, fades, etc.). In some implementations, the user may add a title, music, and other video aspects for sharing and publishing.

Figure 8:
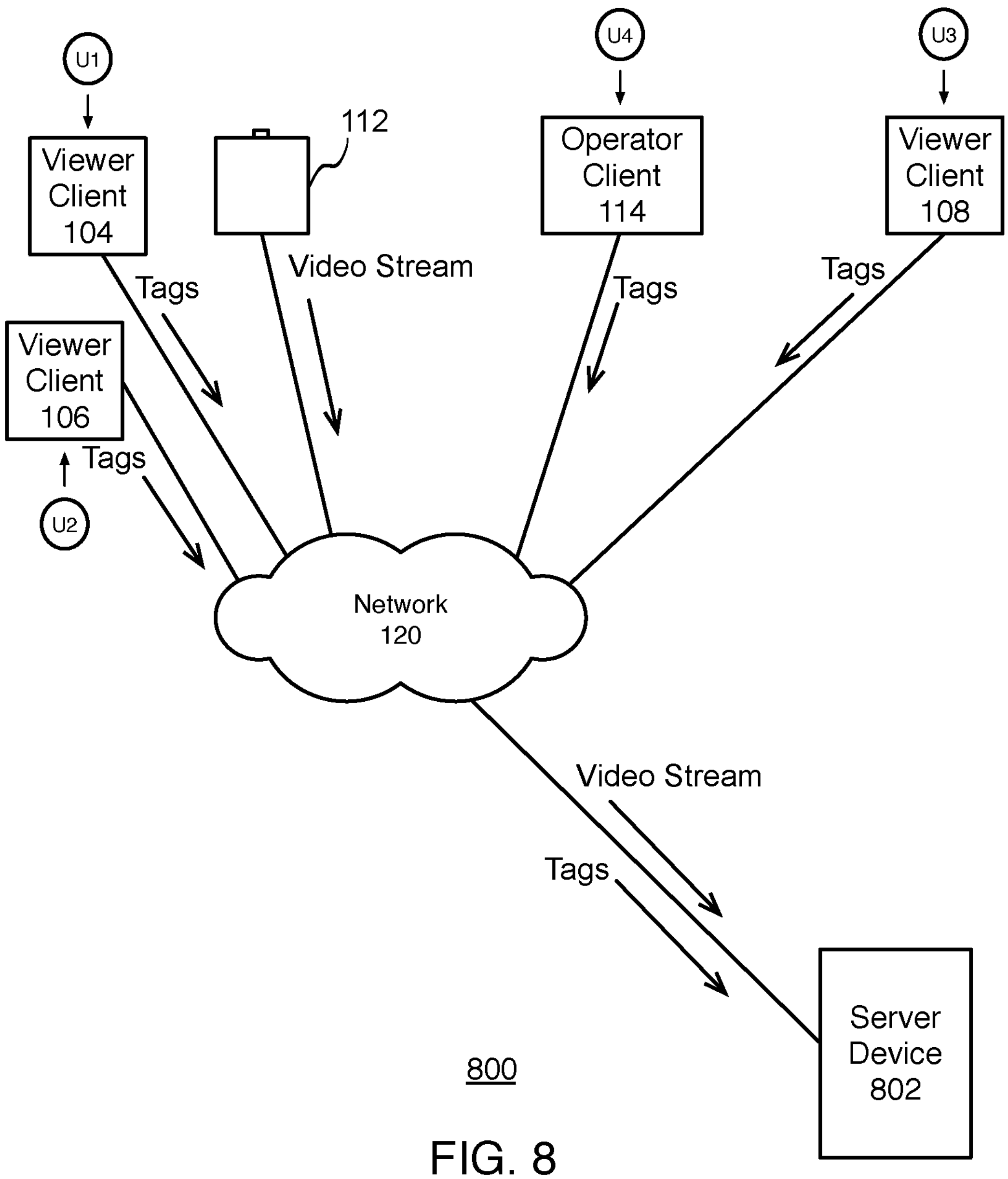
FIG. 8 illustrates a block diagram of an example event environment, according to some implementations.

FIG. 8 illustrates a block diagram of an example event environment 800, according to some implementations. As shown, video camera 112 sends a video stream of an event to a server 802 via network 120. Also, each client device 104, 106, 108, and 114 sends the one or more of the tags to a server 802 via network 120. In various implementations, the one or more tags are used to tag one or more portions of a copy of the video stream stored at the server. In various implementations, the copy of the video stream stored at the server is a higher quality copy than the copy of the video stream stored at the client device. In various implementations, the higher quality copy of the video stream corresponds to the copy of the video stream that is stored on the client device. In various implementations, the copy of the video stream stored on the client device is a lower resolution than the higher quality copy in order to reduce the amount of memory space required on the client device.

Coaches and/or administrators may use tags created by all users (e.g., crowd sourced tags) to generate general and/or specific event highlights. In some implementations, an administrator may log into the server and annotate the event, select key moments, and review viewers interests based on their tags.

Implementations described herein provide various benefits. For example, implementations enable individuals in the crowd watching the event to create personalized highlights for the event they are watching, and to obtain a high quality video of the highlights afterwards. Implementations also provide users with a video of the event from a potentially more optimal vantage point than where they were sitting. Implementations also enable users to share video clips with personalized annotations with others.

Figure 9:
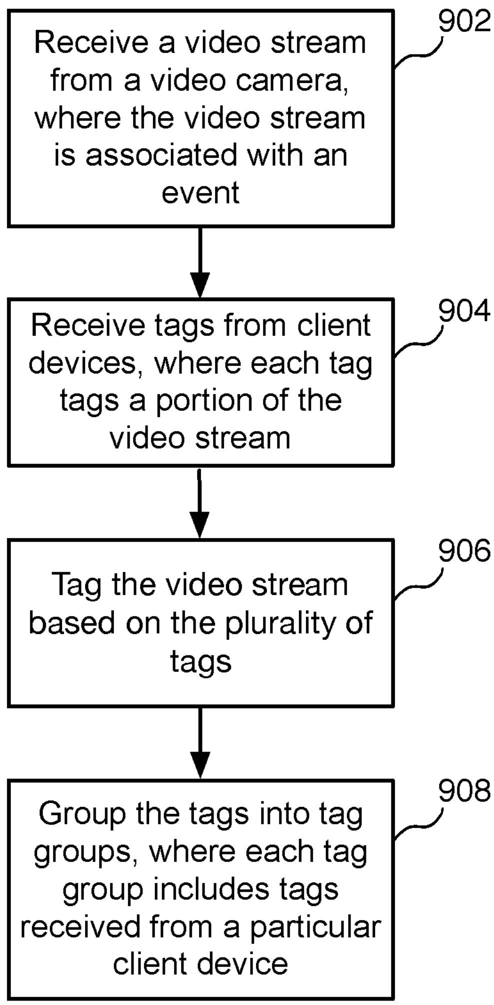
FIG. 9 illustrates an example flow diagram for providing smart tags associated with an event recording, according to some implementations.

FIG. 9 illustrates an example flow diagram for providing smart tags associated with an event recording, according to some implementations. Referring to both FIGS. 8 and 9, a method is initiated at block 902, where the system, such as a server (e.g., server device 802) receives a video stream from a video camera such as video camera 112. In some implementations, the server receives the video stream directly from video camera 112 via the Internet. Video camera 112 sends the video stream to the server, as well as broadcasts the video stream to multiple client devices. As indicated herein, in various implementations, the video stream is a live video stream that covers a current event such as a sports game.

At block 904, the server receives of tags from different client devices (e.g., viewer clients, clickers, etc.). In various implementations, each of the received tags tags a portion of the video stream, where the video stream is associated with an event such as event 102 of FIG. 1. In various implementations, the tags are received from the plurality of client devices via the Internet. In various implementations, the video stream is stored at the sever separately from the tags.

At block 906, the server tags the video stream based on the tags. For example, the server tags different portions of the video stream with different tags from the different client devices. In some implementations, the video stream is stored at a suitable location associated with the server (e.g., a database) and then tagged. As such, the event recording is tagged. Example implementations directed to tagging portions of the video stream or event recording are described in more detail herein.

At block 908, the server groups the tags into tag groups. In various implementations, each tag group includes one or more tags received from a particular client device. Example implementations directed to grouping tags into tag groups are described in more detail herein.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 10:
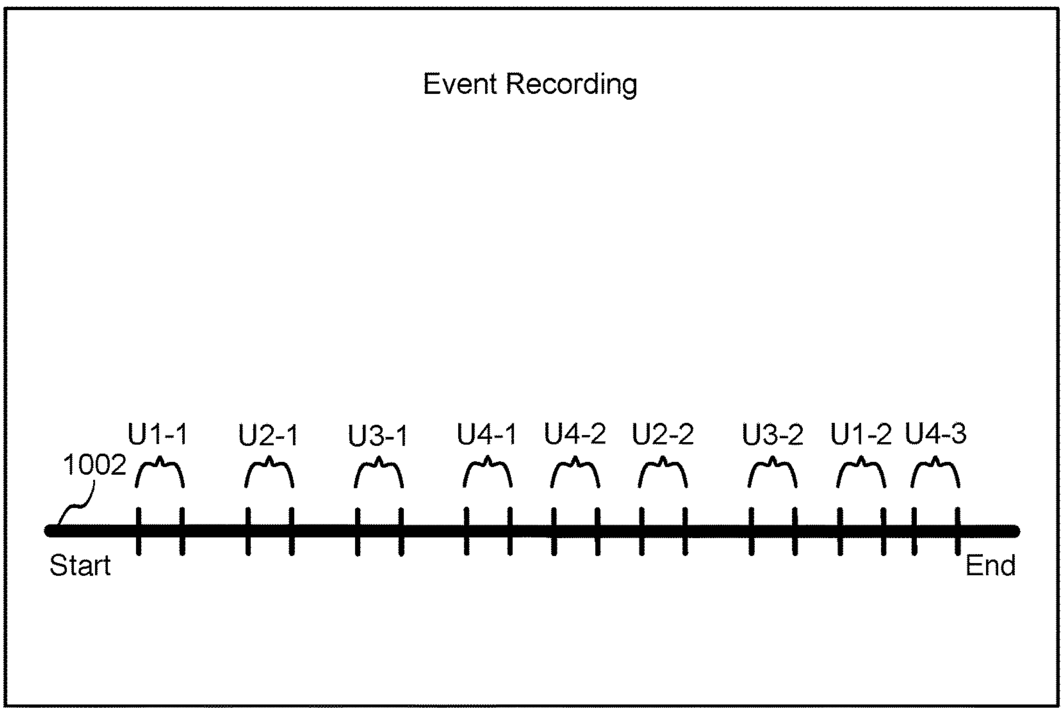
FIG. 10 illustrates a block diagram of an example event recording, according to some implementations.

FIG. 10 illustrates a block diagram of an example event recording 1000, according to some implementations. Shown is a timeline 1002 that represents the duration of event recording 1000. Shown along timeline 1002 are tags associated with different users U1, U2, U3, and U4. As shown, tags associated with user U1 are referred to as U1-1 and U1-2. Tags associated with user U2 are referred to as U2-1 and U2-2. Tags associated with user U3 are referred to as U3-1 and U3-2. Tags associated with user U4 are referred to as U4-1, U4-2, and U4-3.

As indicated herein, each of the received tags tags a portion of the video stream, or event recording 1000. As indicated herein, in various implementations, the tags include tag pairings, including a start time tag and an end time tag, where the start time tag demarcates the beginning of a highlight moment and the end time tag demarcates the end of the highlight moment. The terms event highlight and highlight moment may be used interchangeably.

For ease of illustration nine tags are shown. There may be any number of tags, depending on the particular implementation. In various implementations, each tag pairing demarcates an event moment or event highlight.

Figure 11:
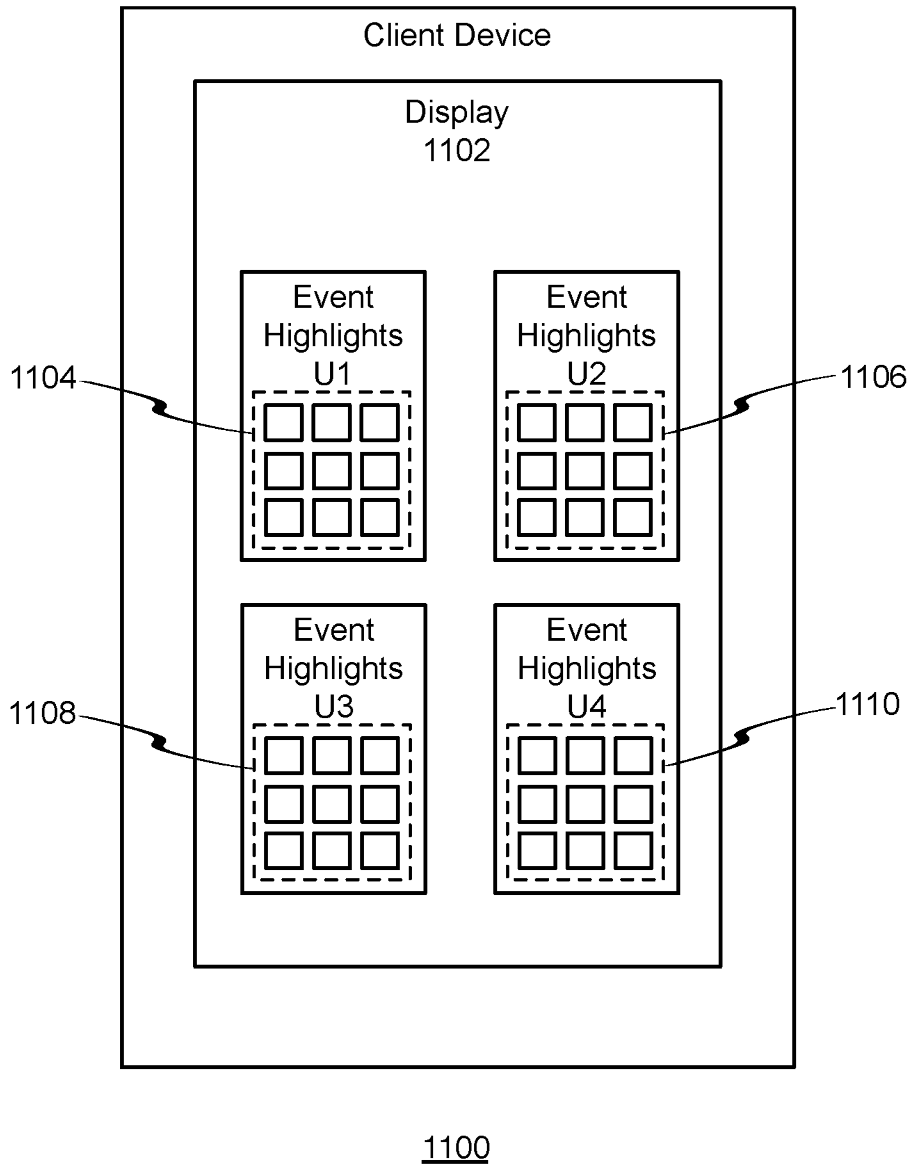
FIG. 11 illustrates a block diagram of an example client device, including a user interface having example highlight recordings from different users, according to some implementations.

FIG. 11 illustrates a block diagram of an example client device 1100, including a user interface having example highlight recordings from different users, according to some implementations. As shown, client device 1100 includes a display 1102, which displays event highlights. More specifically, In various implementations, the client device 1100 displays one or more tags in the graphical user interface on display 1102. Each tag represents an event highlight, and, in particular, a tagged portion of the video stream or event recording. In some implementations, client device 1100 is associated with the server and enables a user or administrator to access server, including the event recording, and associated event highlights. As client device 1100 is associated with the server, the components of client device 1100 such as display 1102 are also associated with the server.

In various implementations, the sever groups the tags into tag groups 1104, 1106, 1108, and 1110, where each tag may be represented by an icon. Each icon may be any visual indicator of a particular portion of the video stream or event recording (e.g., thumbnail, labels, etc.).

In various implementations, each tag group corresponds to a particular client device or user associated with the particular client device. For example, tag group 1104 may be associated with user U1 and presented in a section associated with user U1. Tag group 1106 may be associated with user U2 and presented in a section associated with user U2. Tag group 1106 may be associated with user U3 and presented in a section associated with user U3. Tag group 1108 may be associated with user U4 and presented in a section associated with user U4.

Figure 12:
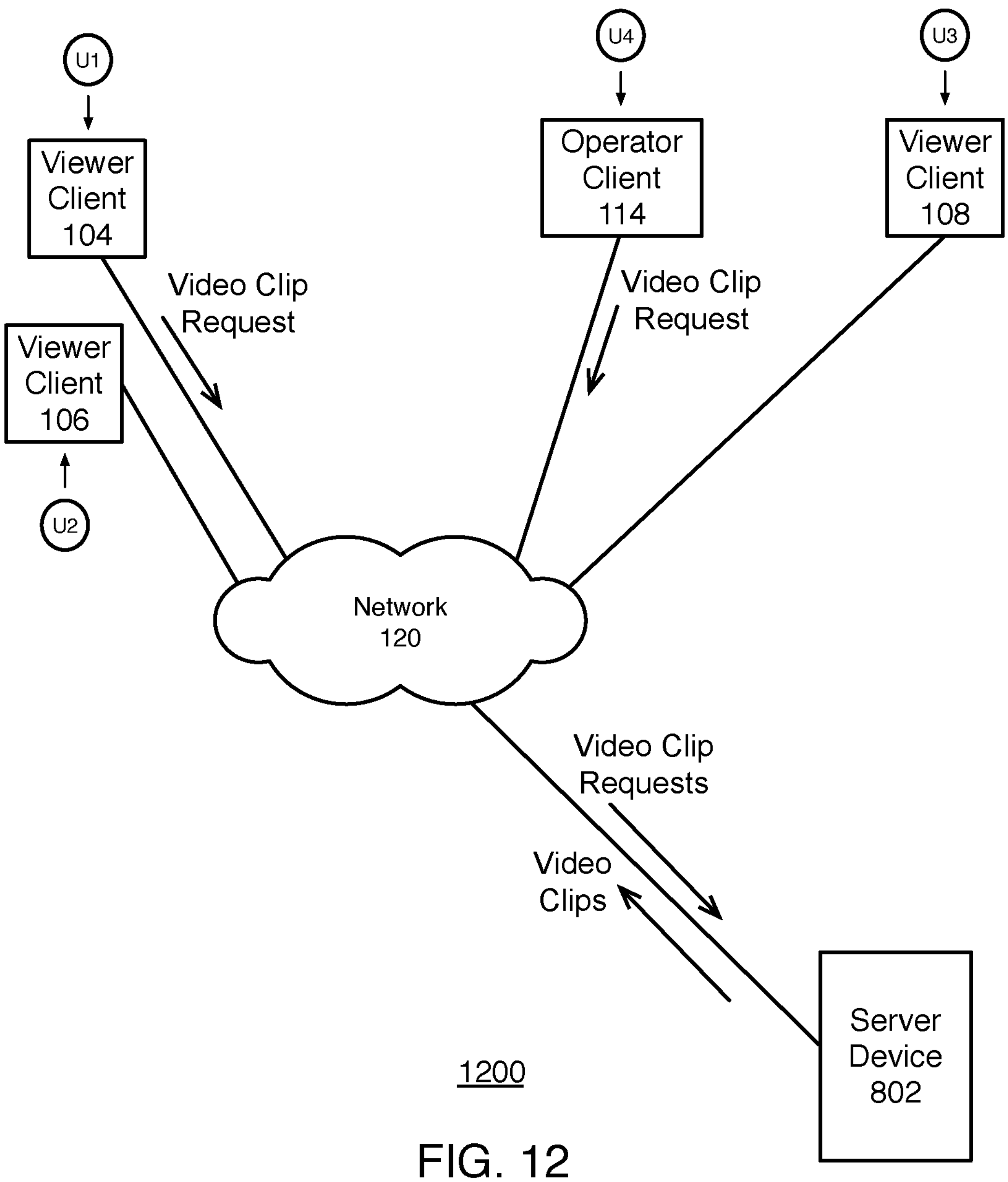
FIG. 12 illustrates a block diagram of an example event environment, including video clip requests, according to some implementations.

FIG. 12 illustrates a block diagram of an example event environment 1200, including video clip requests, according to some implementations. In various implementations, different users may view the icon groups from their client devices, where a given user may select one or more of the icons or event highlights to request a video clip of event highlights. The server receives from a user a selection of one or more of the tags in a video clip request. The server may receive multiple video clip request from multiple users.

Figure 13:
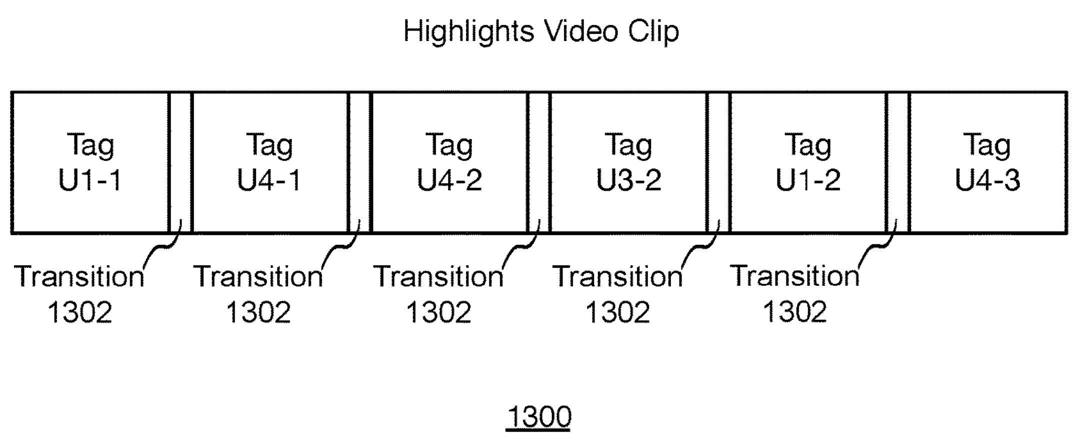
FIG. 13 illustrates a block diagram of an example video clip that includes selected highlight recordings from different users, according to some implementations.

FIG. 13 illustrates a block diagram of an example video clip 1300 that includes selected tags from different users, according to some implementations. In various implementations, for each video clip request, the server generates a video clip of one or more portions of the video stream based on a selection of the one or more tags or event highlights, and sends the video clip to the client device of the requesting user.

In this particular example implementation, video clip 1300 includes tags U1-1, U4-1, U4-2, U3-2, U1-2, and U4-3 that tag portions of the video stream or event recording. The particular selected tags and the particular order may vary, depending on the particular implementation. Any tags that are not included are effectively filtered by not being selected to be included in the video clip. As such, a given user obtains a video clip of user-selected crowd-sourced event highlights.

Figure 14:
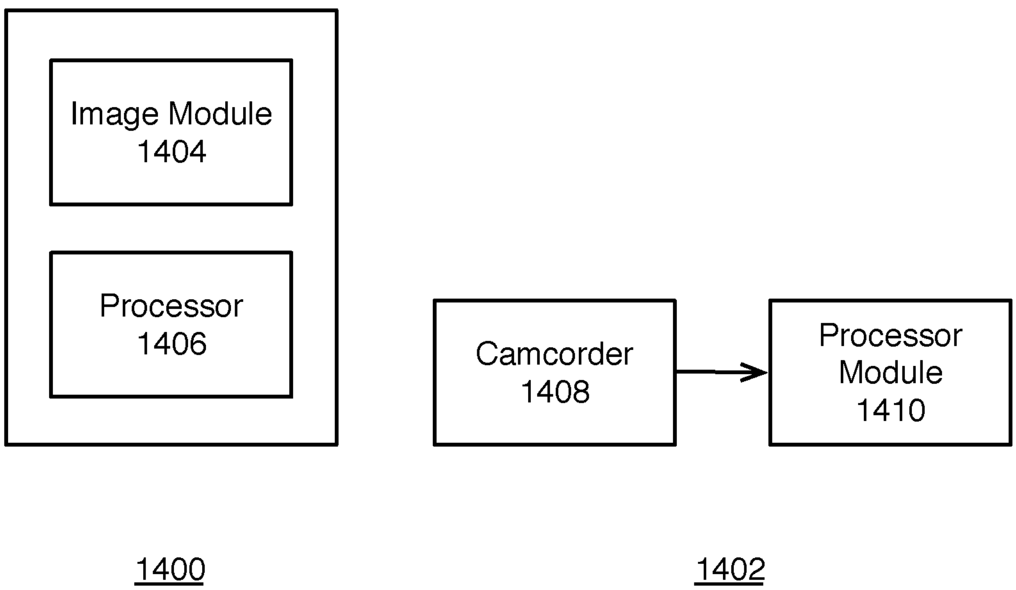
FIG. 14 illustrates block diagrams of example video cameras systems, according to some implementations.

FIG. 14 illustrates block diagrams of example video cameras systems 1400 and 1402, according to some implementations. Video camera system 1400 or video camera system 1402 may be used to implementation video camera 112 of FIGS. 1 and 8. As shown, video camera system 1400 includes an image module 1404 for capturing video and a processor.

As shown, video camera system 1400 includes a camcorder 1408 for capturing video and a processor module 1410. In various implementations, camcorder 1408 or other video camera device (e.g., smart phone, etc.) connects to processor module 1410. In some implementations, processor module 1410 may be a shared resource the connects to multiple video camera devices.

In various implementations, each of video cameras systems 1400 and 1402 may not have all of the components shown and/or may have other elements including other types of elements instead of, or in addition to, those shown herein.

Figure 15:
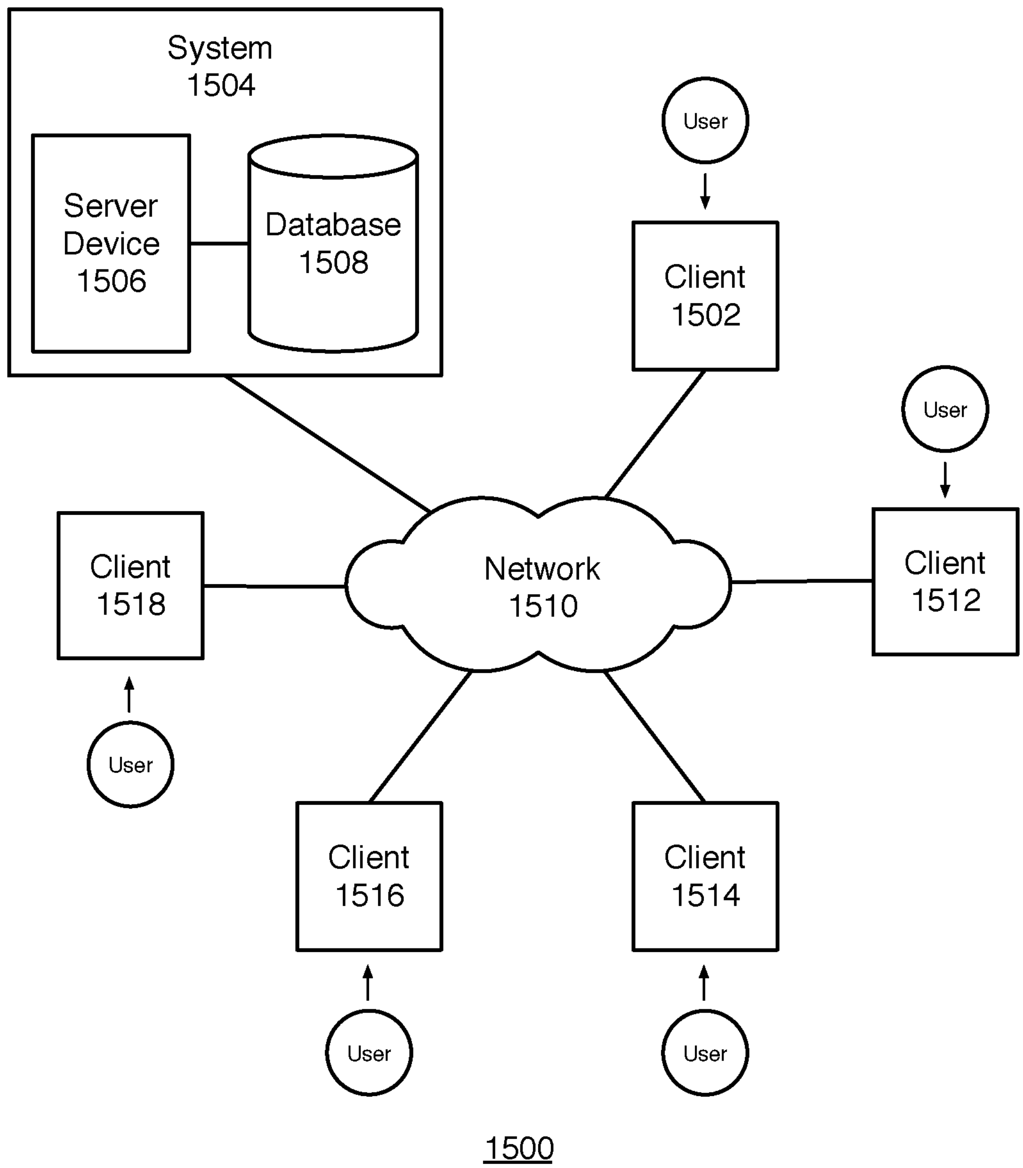
FIG. 15 illustrates a block diagram of an example network environment, which may be used for some implementations described herein.

FIG. 15 illustrates a block diagram of an example network environment 1500, which may be used for some implementations described herein. For example, network elements of network system 1500 may be used to implement network elements of FIGS. 1, 7, and 11, as well as to perform implementations described herein. In some implementations, client 1502 communicates with system 1504. System 1504 may include a server device 1506 and a database 1508. Also shown is a network 1510 through which system 1504 and/or client 1502 may communicate with clients 1512, 1514, 1516, and 1518 (e.g., other user devices).

For ease of illustration, FIG. 15 shows one block for each various components of network environment 1500. These blocks may represent components of each type of component. In other implementations, network environment 1500 may not have all of the components shown and/or may have other elements including other types of elements instead of, or in addition to, those shown herein.

In the various implementations described herein, client 1502 causes the elements described herein (e.g., video streams, controls, and relevant information) to be provided to the user (e.g., displayed in a user interface on one or more display screens, etc.).

Figure 16:
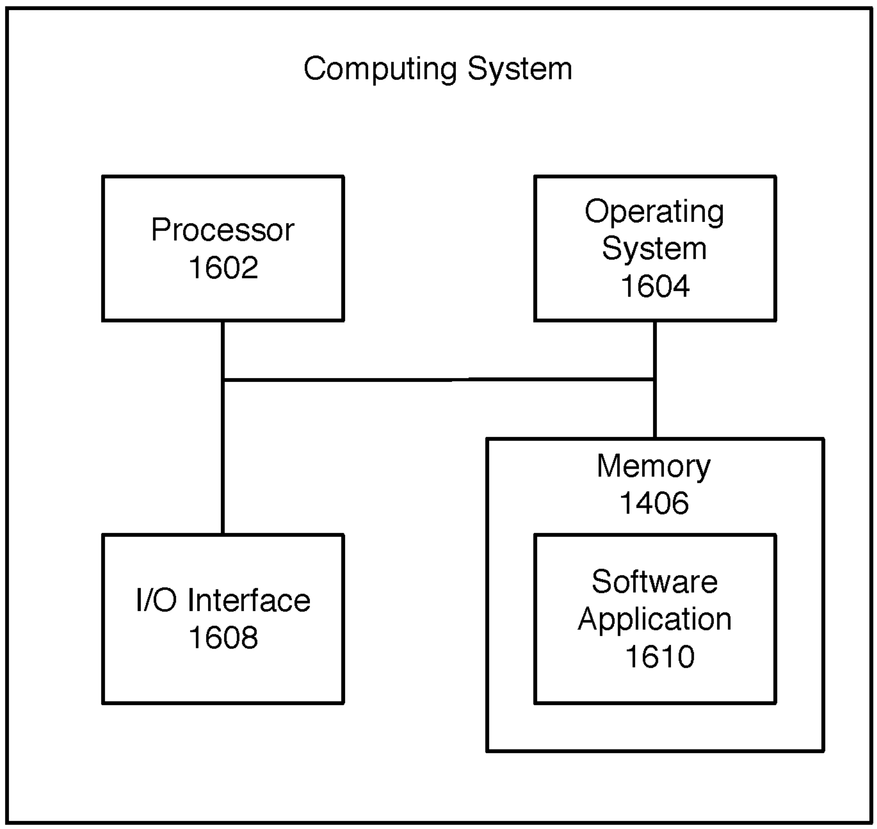
FIG. 16 illustrates a block diagram of an example computing system, which may be used for some implementations described herein.

FIG. 16 illustrates a block diagram of an example computing system 1600, which may be used for some implementations described herein. For example, computing system 1600 may be used to implement the client devices of FIGS. 1, 3, 5, 7, 8, 10, 11, and 13, and the server device of FIGS. 7, 11, and 13, as well as to perform implementations described herein. In some implementations, computing system 1600 may include a processor 1602, an operating system 1604, a memory 1606, and an input/output (I/O) interface 1608. In various implementations, processor 1602 may be used to implement various functions and features described herein, as well as to perform the method implementations described herein. While processor 1602 is described as performing implementations described herein, any suitable component or combination of components of computing system 1600 or any suitable processor or processors associated with computing system 1600 or any suitable system may perform the steps described. Implementations described herein may be carried out on a user device, on a server, or a combination of both.

Computing system 1600 also includes a software application 1610, which may be stored on memory 1606 or on any other suitable storage location or computer-readable medium. Software application 1610 provides instructions that enable processor 1602 to perform the implementations described herein and other functions. Software application may also include an engine such as a network engine for performing various functions associated with one or more networks and network communications. The components of computing system 1600 may be implemented by one or more processors or any combination of hardware devices, as well as any combination of hardware, software, firmware, etc.

For ease of illustration, FIG. 16 shows one block for each of processor 1602, operating system 1604, memory 1606, I/O interface 1608, and software application 1610. These blocks 1602, 1604, 1606, 1608, and 1610 may represent multiple processors, operating systems, memories, I/O interfaces, and software applications. In various implementations, computing system 1600 may not have all of the components shown and/or may have other elements including other types of components instead of, or in addition to, those shown herein.

Although the description has been described with respect to particular embodiments thereof, these particular embodiments are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A computer-implemented method comprising:

receiving, at a client device, a video stream associated with an event;

displaying a tag button in a graphical user interface on a display of the client device when the video stream is being received;

removing the tag button from the graphical user interface when the video stream is not being received;

enabling, at the client device, a user to initiate one or more tag commands by selecting the tag button while the event is being recorded;

receiving, at the client device, the one or more tag commands from a user;

generating one or more tags based on the one or more tag commands, wherein each tag of the one or more tags tags a portion of the video stream;

storing the video stream separately from the one or more tags commands and the one or more tags;

tagging one or more portions of the video stream based on the one or more tags; and storing a copy of the video stream and the one or more tags on the client device.

2. The method of claim 1, wherein the video stream is received directly from a video camera.

3. The method of claim 1, wherein the video stream is a live video stream.

4. The method of claim 1, wherein the one or more tags include one or more of fixed tags and variable tags.

5. The method of claim 1, further comprising enabling the user to select the tag button, wherein one or more selections of the tag button generate the one or more tag commands.

6. The method of claim 1, further comprising:

displaying one or more tags in a graphical user interface on a display of the client device;

receiving from the user a selection of one or more of the tags; and generating, at the client device, a video clip of one or more portions of the video stream based on the selection of the one or more tags.

7. The method of claim 1, wherein at least one operator user is designated to control a video camera that is capturing the video stream.

8. The method of claim 1, further comprising sending the one or more tags to a server, wherein the one or more tags are used to tag one or more portions of a copy of the video stream stored at the server.

9. A non-transitory computer-readable storage medium with program instructions stored thereon, the program instructions when executed by one or more processors are operable to perform operations comprising:

receiving, at a client device, a video stream associated with an event;

displaying a tag button in a graphical user interface on a display of the client device when the video stream is being received;

removing the tag button from the graphical user interface when the video stream is not being received;

enabling, at the client device, a user to initiate one or more tag commands by selecting the tag button while the event is being recorded;

receiving, at the client device, the one or more tag commands from a user;

generating one or more tags based on the one or more tag commands, wherein each tag of the one or more tags tags a portion of the video stream;

storing the video stream separately from the one or more tags commands and the one or more tags;

tagging one or more portions of the video stream based on the one or more tags; and storing a copy of the video stream and the one or more tags on the client device.

10. The computer-readable storage medium of claim 9, wherein the video stream is received directly from a video camera.

11. The computer-readable storage medium of claim 9, wherein the video stream is a live video stream.

12. The computer-readable storage medium of claim 9, wherein the one or more tags include one or more of fixed tags and variable tags.

13. The computer-readable storage medium of claim 9, wherein the instructions when executed are further operable to perform operations comprising enabling the user to select the tag button, wherein one or more selections of the tag button generate the one or more tag commands.

14. The computer-readable storage medium of claim 9, wherein the instructions when executed are further operable to perform operations comprising:

displaying one or more tags in a graphical user interface on a display of the client device;

receiving from the user a selection of one or more of the tags; and generating, at the client device, a video clip of one or more portions of the video stream based on the selection of the one or more tags.

15. The computer-readable storage medium of claim 9, wherein at least one operator user is designated to control a video camera that is capturing the video stream.

16. The computer-readable storage medium of claim 9, wherein the instructions when executed are further operable to perform operations comprising sending the one or more tags to a server, wherein the one or more tags are used to tag one or more portions of a copy of the video stream stored at the server.

17. A system comprising:

one or more processors; and logic encoded in one or more non-transitory computer-readable storage media for execution by the one or more processors and when executed operable to perform operations comprising:

receiving, at a client device, a video stream associated with an event;

displaying a tag button in a graphical user interface on a display of the client device when the video stream is being received;

removing the tag button from the graphical user interface when the video stream is not being received;

enabling, at the client device, a user to initiate one or more tag commands by selecting the tag button while the event is being recorded;

receiving, at the client device, the one or more tag commands from a user;

generating one or more tags based on the one or more tag commands, wherein each tag of the one or more tags tags a portion of the video stream;

storing the video stream separately from the one or more tags commands and the one or more tags;

tagging one or more portions of the video stream based on the one or more tags; and storing a copy of the video stream and the one or more tags on the client device.

18. The system of claim 17, wherein the video stream is received directly from a video camera.

19. The system of claim 17, wherein the video stream is a live video stream.

20. The system of claim 17, wherein the one or more tags include one or more of fixed tags and variable tags.

* * * * *